United States Patent [19]
Chung

[11] Patent Number: 6,079,277
[45] Date of Patent: Jun. 27, 2000

[54] METHODS AND SENSORS FOR DETECTING STRAIN AND STRESS

[75] Inventor: Deborah D. L. Chung, East Amherst, N.Y.

[73] Assignee: The Research Foundation of State University of New York, Amherst, N.Y.

[21] Appl. No.: 08/990,062

[22] Filed: Dec. 12, 1997

Related U.S. Application Data

[60] Provisional application No. 60/032,868, Dec. 13, 1996.

[51] Int. Cl.⁷ .................................................. G01B 7/16
[52] U.S. Cl. ............................................... 73/774; 73/776
[58] Field of Search ........................... 73/777, 776, 778, 73/779, 794, 795, 796, 774

[56] References Cited

U.S. PATENT DOCUMENTS

| | | |
|---|---|---|
| 3,404,061 | 10/1968 | Shane et al. . |
| 3,940,974 | 3/1976 | Taylor ....................................... 73/796 |
| 4,203,327 | 5/1980 | Singh . |
| 4,309,686 | 1/1982 | Russell . |
| 4,411,159 | 10/1983 | Spear et al. . |
| 4,605,919 | 8/1986 | Wilner . |
| 4,663,230 | 5/1987 | Tennent . |
| 4,708,019 | 11/1987 | Rubner et al. . |
| 4,729,910 | 3/1988 | Fukuda et al. . |
| 4,744,252 | 5/1988 | Stout . |
| 4,808,336 | 2/1989 | Rubner et al. . |
| 4,841,272 | 6/1989 | Yamagishi et al. . |
| 4,939,496 | 7/1990 | Destannes . |
| 5,098,771 | 3/1992 | Friend . |
| 5,100,737 | 3/1992 | Colombier et al. . |
| 5,124,075 | 6/1992 | Yasuda et al. . |
| 5,165,909 | 11/1992 | Tennent et al. . |
| 5,168,759 | 12/1992 | Bowman . |
| 5,171,560 | 12/1992 | Tennent . |
| 5,225,379 | 7/1993 | Howard . |
| 5,304,326 | 4/1994 | Goto et al. . |
| 5,440,300 | 8/1995 | Spillman . |
| 5,445,327 | 8/1995 | Creehan . |
| 5,505,093 | 4/1996 | Giedd et al. .............................. 73/774 |
| 5,533,165 | 7/1996 | Burris et al. . |
| 5,817,944 | 10/1998 | Chung ....................................... 73/774 |

OTHER PUBLICATIONS

Kost et al., "Effects of Axial Stretching on the Resistivity of Carbon Black Filled Silicone Rubber," *Polymer Engineering and Science*, 23:567–571 (1983).

Kost et al., Resistivity Behavior of Carbon Black Filled Silicone Rubber in Cyclic Loading Experiments, *Journal of Applied Polymer Science*, 29:3937–3946 (1984).

Schulte, "Load and Failure Analyses of CFRP Laminates by Means of Electrical Resistivity Measurements," *Composites Science and Technology*, 36:63–76 (1989).

Headifen et al., "Mechanical and Electrical Properties of Glass and Carbon Fiber Reinforced Composites," *Composite Material Technology 1990: Presented at the 13th Annual Energy–Sources Technology Conference and Exhibition*, New Orleans, Jan. 14–16, 1990, pp. 113–118 (1990).

(List continued on next page.)

*Primary Examiner*—Max Noori
*Attorney, Agent, or Firm*—Nixon Peabody LLP

[57] ABSTRACT

The present invention relates to strain or stress sensors which include a first planar conductive element, a second planar conductive element, and a flexible graphite sheet sandwiched between the first and second planar conductive elements. The flexible graphite sheet includes a mass of expanded graphite particles compressed together in the absence of a binder. Prior to compression, the expanded graphite particles have a c direction dimension which is at least 80 times that of the graphite particles from which the expanded particles are formed. The sensor is configured so that compression of the sensor causes a change in resistance which can be correlated to strain or stress. The present invention also relates to a strain or stress sensor which includes a polymeric composite, a first electrically conductive lead connected to a first point on or in the polymeric composite, and a second electrically conductive lead connected to a second point on or in the polymeric composite. The polymeric composite includes a polymeric matrix material and carbon filaments having diameters of from about 0.01 $\mu$m to about 1.0 $\mu$m dispersed therein. Methods for detecting strain or stress are also disclosed.

17 Claims, 12 Drawing Sheets

OTHER PUBLICATIONS

Pramanik et al., "Rubber Composite Filled with Particulate Carbon Fibre," *Journal of Materials Science*, 25:3848–3853 (1990).

Muto et al., "Preventing Fatal Fractures in Carbon–Fiber–Glass–Fiber–Reinforced Plastics Composites by Monitoring Change in Electrical Resistance," *Journal of the American Ceramic Society*, 76:875–879 (1993).

Pramanik et al., "Effect of Extensional Strain on the Resistivity of Electrically Conductive Nitrile–Rubber Composites Filled with Carbon Filler," *Journal of Materials Science*, 28:3539–3546 (1993).

Radhakrishnan et al., "High Piezoresistivity in Conducting Polymer Composites," *Materials Letters*, 18:358–362 (1994).

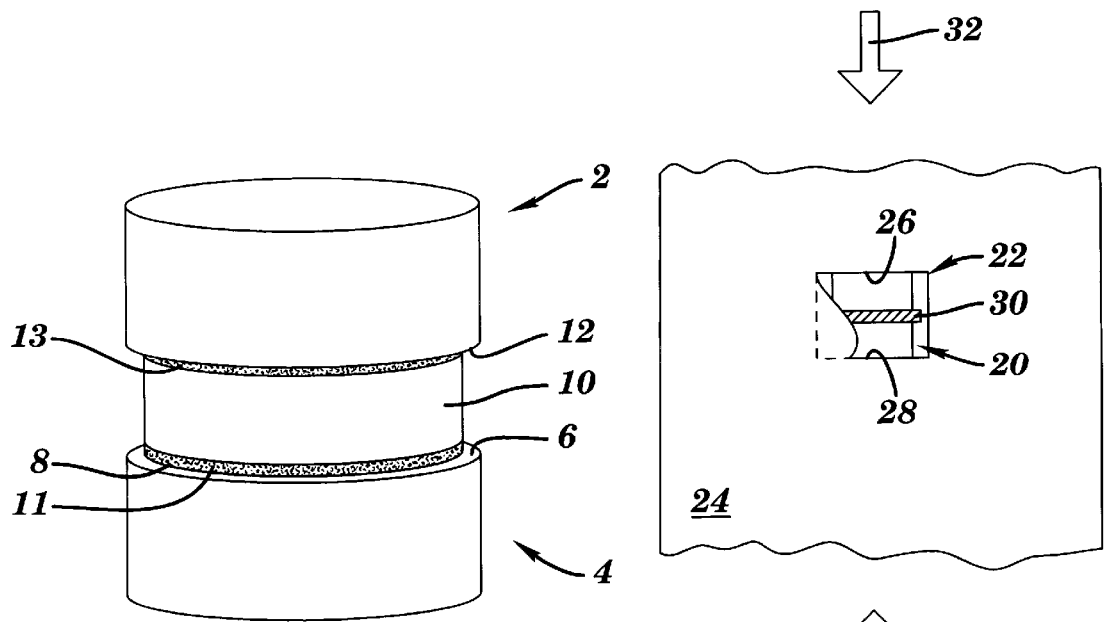
FIG. 1A
FIG. 1B
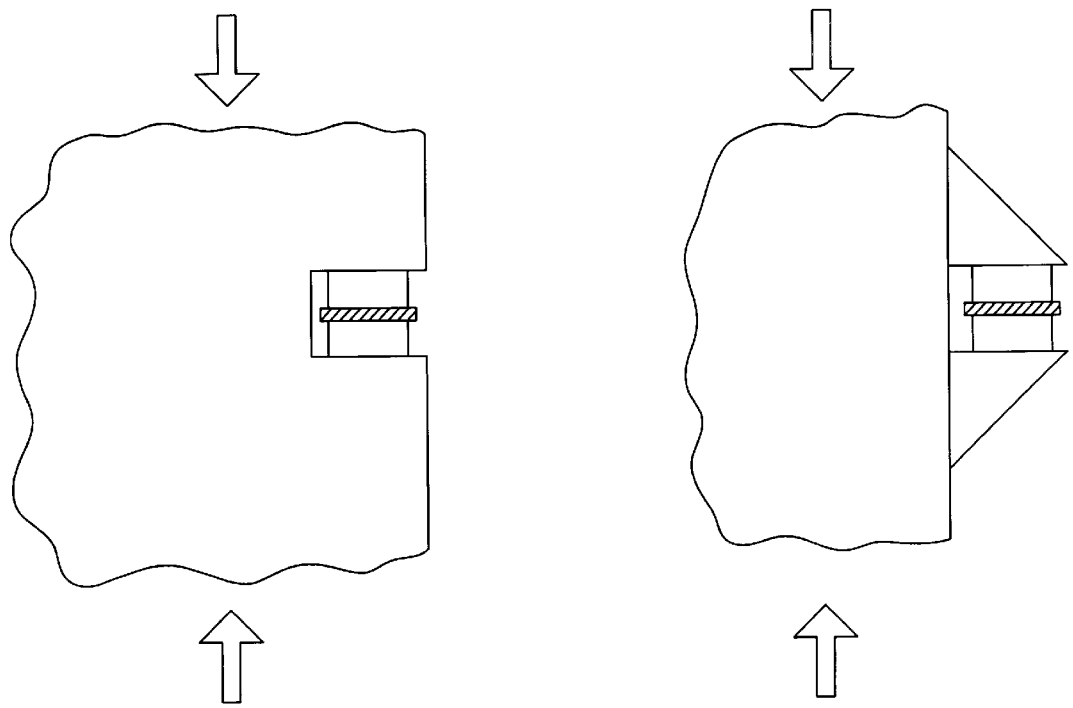
FIG. 1C
FIG. 1D

METHODS AND SENSORS FOR DETECTING STRAIN AND STRESS

The present application claims the benefit of U.S. Provisional Patent Application Ser. No. 60/032,868, filed Dec. 13, 1996.

FIELD OF THE INVENTION

The present invention relates strain or stress sensors and to methods for measuring strain or stress.

BACKGROUND OF THE INVENTION

A strain gauge is a device for measuring dimensional change primarily on the surface of a specimen as the latter is subjected to mechanical, thermal, or a combination of both stresses. One type of strain gauge is attached to the specimen surface and mechanically amplifies the surface distortion so that the change can be measured on a simple dial indicator. Other types of strain gauges measure the displacement of light rays through an optical system that is actuated by the surface strain or convert this strain into an electrical signal. The mechanical, electromechanical, and optical strain gauge devices are considered extensometers, and their use is generally limited to calibration or to the testing of materials' properties.

The electrical type of strain gauge is in wide use today and has found applications far beyond those of a conventional extensometer. Strain/stress sensors that give an electrical output that relates to the strain/stress are increasingly important due to the advent of smart structures, such as those discussed in U.S. Pat. No. 5,440,300 to Spillman, Jr., which require strain/stress sensing either to monitor structural health or to control the structure.

Electrical-type strain gauges can be based upon the measurement of a change in capacitance, inductance, resistance, or dipole moment that is proportional to strain. The principle of a resistance-type strain gauge can be illustrated with a rod-shaped conductor whose resistivity, $\rho$, remains reasonably constant over the range of strains encountered. As the rod is elongated in response to tensile stress, the length ("L") of the rod increases and its cross-sectional area ("A") decreases. Since the resistance ("R") of a conducting varies directly with the conducting rod's length and inversely with its cross-sectional area according to the formula $R=\rho L/A$, elongation causes an increase in the rod's resistance. The resistance change ("$\Delta R/R_o$"), is related to the length change (i.e., strain, "$\Delta L/L$"), by the formula: $\Delta R/R_o = \epsilon(\Delta L/L)$, $\epsilon$ is the strain sensitivity or gauge factor. Materials, such as the metal rod used above to illustrate the concept, which exhibit changes in their electrical resistance due to strain/stress are said to be piezoresistive.

Semiconductors, the energy band gap of which changes with strain/stress (Gridchin et al., *Sensors Actuators A*, 49:67–72 (1995)) represent another type of piezoresistive material. The most common type of piezoresistive material is a composite material with an electrically non-conducting matrix, usually a polymer, and a conducting filler. Conventional fillers include: carbon fibers having a 10 $\mu$m diameter (Muto et al., *J. Ceramic Soc. Jpn.*, 100:582–585 (1992) and Pramanik et al., *J. Mat. Sci.*, 25:3848–3853 (1990) ("Pramanik")); carbon black (Pramanik, Kost et al., *J. Appl. Polymer Science*, 29:3937–3946 (1984), and Radhakrishnan et al., *Mater. Lett.*, 18:358–362 (1994) ("Radhakrishnan")); and metal particles (Radhakrishnan). Upon tension, the distance between adjacent filler units increases, so the resistivity increases; upon compression, the distance between adjacent filler units decreases, so the resistivity decreases. Thus, in these materials, the change in electrical resistance is due not only to a change in the material's dimensions but also to a change in its electrical resistivity.

One shortcoming of conventional piezoresistive strain sensors, such as those described above, is the non-linearity between the resistivity change and the strain which most of these piezoresistive strain sensors exhibit. Little attention has been paid to the alleviation of this problem via the design of the composite. Conventional piezoresistive strain sensors also suffer from low strain sensitivities, making them unsuitable for applications where strains and stresses are small. Moreover, conventional piezoresistive strain sensors, especially those which employ a filler in a polymeric matrix, do not have the chemical and thermal resistance needed in many applications.

Therefore, there is a continuing need for new methods for measuring strain/stress, strain/stress sensors, and compositions useful therefor. The present invention is directed to these methods, sensors, and compositions.

SUMMARY OF THE INVENTION

The present invention relates to strain or stress sensors including a first planar conductive element, a second planar conductive element, and a flexible graphite sheet sandwiched between the first and second planar conductive elements. The flexible graphite sheet includes a mass of expanded graphite particles compressed together in the absence of a binder. Prior to compression, the expanded graphite particles have a c direction dimension which is at least 80 times that of the graphite particles from which the expanded particles are formed. The sensor is configured so that compression of the sensor causes a change in resistance which can be correlated to strain or stress.

The present invention also relates to a method for detecting strain or stress. A strain or stress sensor which includes a first planar conductive element, a second planar conductive element, and a flexible graphite sheet sandwiched between the first and second planar conductive elements is provided. The flexible graphite sheet includes a mass of expanded graphite particles compressed together in the absence of a binder. Prior to compression, the expanded graphite particles have a c direction dimension which is at least 80 times that of the graphite particles from which the expanded particles are formed, and the sensor is configured so that compression of the sensor causes a change in electrical resistance. The method further includes detecting a property of the strain or stress sensor which can be related to electrical resistance between the first and second planar conductive elements and correlating the property to strain or stress.

In another aspect, the present invention relates to a strain or stress sensor which includes a polymeric composite, a first electrically conductive lead connected to a first point on or in the polymeric composite, and a second electrically conductive lead connected to a second point on or in the polymeric composite. The polymeric composite includes a polymeric matrix material and carbon filaments having diameters of from about 0.01 $\mu$m to about 1.0 $\mu$m dispersed therein.

The present invention is also directed to a method for detecting strain or stress using a polymeric composite which includes a polymeric matrix material and carbon filaments having diameters of from about 0.01 $\mu$m to about 1.0 $\mu$m dispersed therein. A property of the polymeric composite which can be related to electrical resistance between a first point on or in the polymeric composite and a second point on or in the polymeric composite is detected and then correlated to strain or stress.

The strain or stress sensors of the present invention can be used to detect or monitor strains and stresses in buildings and other structures, such as bridges, aircraft wing assemblies, and machinery. In addition, the strain or stress sensors can be used as a design tool using prototypes of such structures or other articles of manufacture, such as car frames, to establish the structural requirements of various components.

The properties of the strain or stress sensors of the present invention make them particularly well-suited for specific applications. For example, the strain or stress sensors of the present invention which include a flexible graphite sheet sandwiched between two planar conductive elements have improved stability to chemicals and high temperatures, making them particularly useful in harsh environments. In addition, because of their large strain and stress sensitivities, they are particularly well-suited in applications where small strains and stresses can lead to material failure. On the other hand, the carbon filament-containing strain or stress sensors of the present invention, compared with piezoresistive strain or stress sensors containing carbon fibers, are significantly less noisy and exhibit a much more linear and reproducible relationship between resistivity increase and strain. Moreover, the filament-containing strain or stress sensors have a significantly lower percolation threshold than the percolation threshold of fiber-containing composites and, therefore, require a much lower filler volume fraction.

BRIEF DESCRIPTION OF THE DRAWINGS

FIG. 1A is a perspective drawing of a strain or stress sensor of the present invention. FIGS. 1B–1D are cross sectional drawings of specimens in which strain or stress is to be evaluated showing various positional configurations for the strain or stress sensors of the present invention. In each of FIGS. 1B–1D, large hollow arrows indicate the direction of compressive stress.

DETAILED DESCRIPTION OF THE INVENTION

Figure 2:
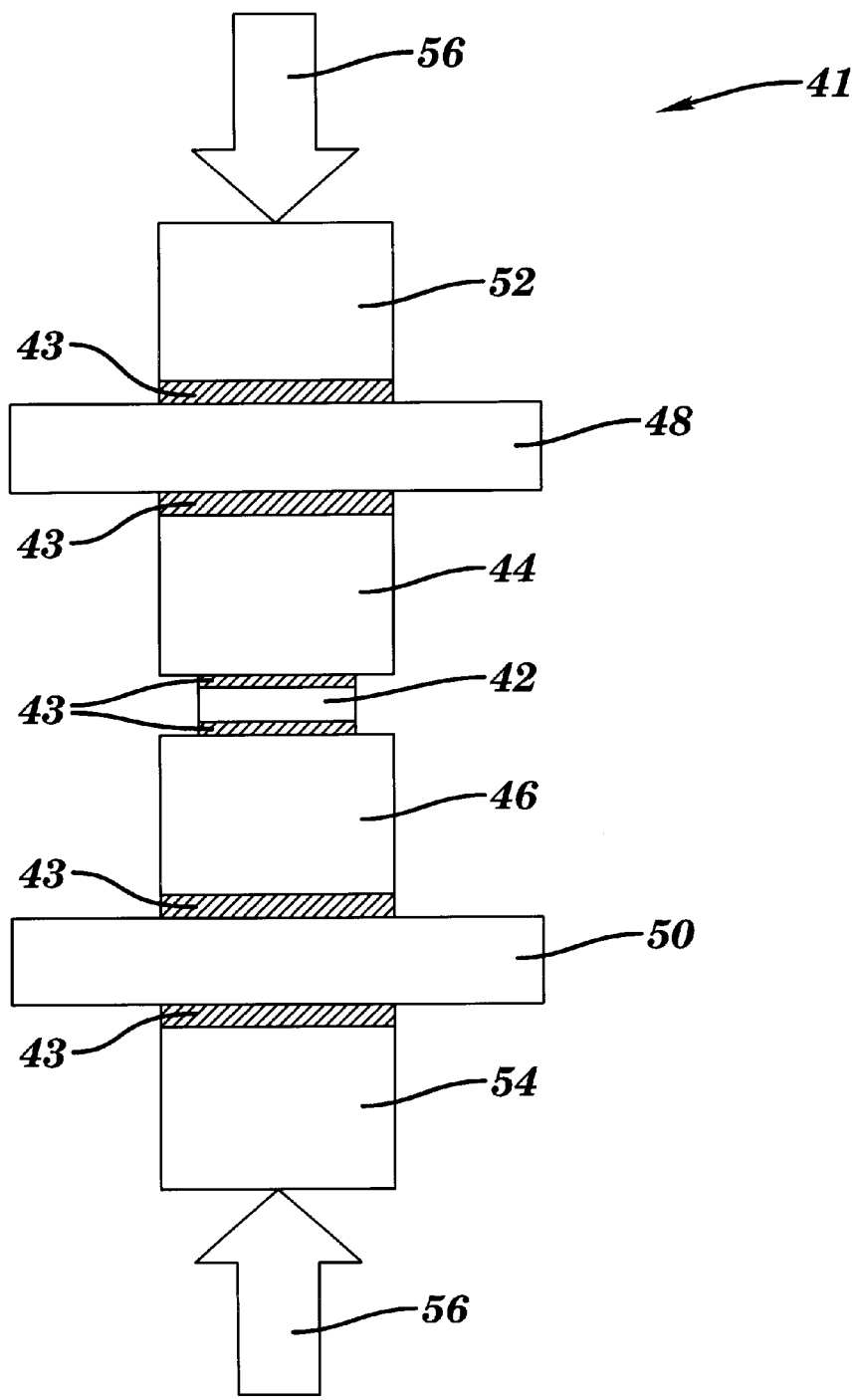
FIG. 2 is a cross sectional drawing of a strain or stress sensor of the present invention which was employed in Example 2.

The present invention relates to strain or stress sensors which include a first planar conductive element, a second planar conductive element, and a flexible graphite sheet sandwiched between the first and second planar conductive elements.

The flexible graphite sheet is made of expanded graphite particles which are compressed together in the absence of a binder. Briefly, flexible, binderless graphite sheet material, in the form of, for example, paper, strip, tape, foil, mat, or the like, is produced by compressing or compacting expanded graphite particles in the absence of a binder. Compression of these particles can be effected, for example, in a continuous process by passing the particles through a pair of pinch rollers. Alternatively, they can be compacted by using a hydraulic press. Once compressed, the expanded graphite particles, which generally are worm-like or vermiform in appearance prior to compression, will maintain the compression set. The density and thickness of the sheet material can be varied by controlling the degree of compression. Flexible graphite sheets having densities within the range from about 5 pounds per cubic foot to about 137 pounds per cubic foot are typical.

The expanded graphite particles used to make the flexible graphite sheet have a c direction dimension which is at least 80 times and preferably 200 times that of the original particles. Expanded graphite particles suitable for use in making the flexible graphite sheets used in the stress or strain sensors of the present invention can be prepared by chemically treating natural graphite particles or by heat treating pyrolytic graphite particles to cause interlayer expansion.

Interlayer attack of graphite particles is preferably achieved by subjecting the graphite particles to oxidizing conditions. Various oxidizing agents and oxidizing mixtures can be employed to effect controlled interlayer attack. For example, nitric acid, potassium chlorate, chromic acid, potassium permanganate, potassium chromate, potassium dichromate, perchloric acid, and the like can be used. These may be used individually or in mixtures, such as, for instance, mixtures of concentrated nitric acid and potassium chlorate, chromic acid and phosphoric acid, and sulfuric acid and nitric acid. Alternatively, mixtures of a strong organic acid, such as trifluoroacetic acid, and a strong oxidizing agent soluble in the organic acid can be used. Oxidizing agent solutions having concentrations of oxidizing agent ranging from 0.1 N to concentrated strengths can be effectively employed to bring about interlayer attack. The acids used with the oxidizing agents to form suitable oxidizing media or mixtures can be employed in concentrations ranging from about 0.1 N to concentrated strengths.

For example, one suitable oxidizing medium contains sulfuric acid and an oxidizing agent, such as nitric acid, perchloric acid, chromic acid, potassium permanganate, iodic acid, or periodic acids. Preferably the oxidizing medium contains sulfuric and nitric acids. The ratio of sulfuric acid to oxidizing agent, such as nitric acid, can range from about 9 to 1 or higher to about 1 to 1. Likewise, various sulfuric and nitric acid concentrations can be employed, e.g. 0.1 N, 1.0 N, 10 N, and the like.

The treatment of graphite particles with oxidizing agents or oxidizing mixtures such as mentioned above is preferably carried out at a temperature between about room temperature and about 125° C. and for periods of time sufficient to produce a high degree of interlayer attack. The treatment time will depend upon factors such as the temperature of the oxidizing medium, the grade or type of graphite treated, the size of the graphite particles, the amount of expansion desired, and the strength of the oxidizing medium.

Expansion of carbon layers can also be achieved by chemically treating graphite particles with an intercalating solution or medium so that a suitable additive is inserted or intercalated between the planar carbon hexagon networks, thus forming an addition or intercalation compound of graphite. For example, the additive can be a halogen, such as bromine, or a metal halide, such as ferric chloride or aluminum chloride. A halogen, particularly bromine, can be intercalated by contacting the graphite particles with bromine vapor, with a solution of bromine in sulfuric acid, or with a solution of bromine in a suitable organic solvent. Metal halides can be intercalated by contacting the graphite particles with a suitable metal halide solution. For example, ferric chloride can be intercalated by contacting graphite particles with a suitable aqueous solution of ferric chloride or with a mixture containing ferric chloride and sulfuric acid. Temperatures, times, and concentrations of reactants similar to those mentioned above are suitable for carrying out the intercalation processes.

Upon completion of the treatment directed to promoting interlayer attack, the thoroughly wetted or soggy graphite particles are subjected to conditions for bringing about their expansion. Preferably, however, the treated graphite particles are first rinsed with an aqueous solution.

The c direction expansion is brought about by activating a material, such as, for example, a suitable foaming or blowing agent which has been incorporated between layers of parallel carbon networks. The foaming or blowing agent can be incorporated in the interlayer spaces either during the interlayer attack treatment or thereafter. The incorporated foaming or blowing agent upon activation, such as by chemical interaction or by heat, generates a fluid pressure which is effective to cause c direction expansion of the graphite particles. Preferably, a foaming or blowing agent is utilized which when activated forms an expanding gas or vapor which exerts sufficient pressure to cause expansion.

A wide variety of well-known foaming and blowing agents can be employed. For example, expanding agents, such as water or other volatile liquids (e.g., liquid nitrogen), which change their physical state during the expansion operation, can be used. When an expanding agent of the above type is employed, the expansion of the treated graphite particles is preferably achieved by subjecting the treated graphite particles to a temperature sufficient to produce a gas pressure which is effective to bring about an almost instantaneous and maximum expansion of the particles. For instance, when the expanding agent is water, the graphite particles having water incorporated in the interlayer spaces are preferably rapidly heated or subjected to a temperature above 100° C. so that a substantially instantaneous and full expansion of the graphite particles is effected. If the particles to be expanded are slowly heated to a temperature above 100° C., substantial water or other expanding agent will be lost by vaporization from the structure resulting in a drying of the structure so that less than optimal expansion will be achieved. Preferably, the substantially complete and full expansion of the graphite particles is accomplished within a time of from about a fraction of a second to about 10 seconds.

In addition to physical expanding methods such as described above, the expanding gas can be generated in situ (that is, between layers of carbon networks) by the interaction of suitable chemical compounds or by the use of a suitable heat sensitive additive or chemical blowing agent.

By treating the graphite particles with a suitable oxidizing medium and permitting unrestricted expansion, as described above, expanded graphite masses having expansion ratios of at least 80 to 1 or higher are produced. In other words, the expanded graphite particles have a thickness or c direction dimension which is at least 80 times that of the original c direction dimension. The expanded graphite particles are unitary, laminar structures having a vermiform appearance. The vermiform masses are substantially pure, lightweight, anisotropic graphite.

Alternatively, the flexible graphite sheet can be obtained from commercial sources, such as EGC Enterprises, Inc. (Mentor, Ohio).

The thickness of the flexible graphite sheet is not particularly critical to the practice of the present invention. Preferably, the flexible graphite sheet has a thickness of at least a few dozen atom layers so that it exhibits the resilience which is characteristic of flexible graphite. More preferably, the flexible graphite sheet has a thickness of from about 0.1 mm to about 30 mm, most preferably from about 1 mm to about 5 mm. The flexible graphite sheet is defined by two planar surfaces separated by a distance equal to the thickness of the flexible graphite sheet. The flexible graphite sheet preferably has an electrical resistivity of from $1 \times 10^{-5}$ to $1 \times 10^{-2}$ $\Omega$.cm in a direction parallel to the flexible graphite sheet's substantially parallel surfaces and an electrical resistivity of from about 0.05 to about 5 $\Omega$.cm in a direction perpendicular to the flexible graphite sheet's parallel surfaces.

The first and second planar conductive elements are in contact with the flexible graphite sheet's opposing parallel surfaces. Preferably, contact between the first and second planar conductive elements and the flexible graphite sheet is maintained physically rather than through any type of chemical interaction. That is, it is preferred that the first and second conductive elements not adhere to the flexible graphite sheet, such as would be the case were the first and second planar conductive elements electro-deposited or chemically deposited on the flexible graphite sheet. In this way, the first and second planar conductive elements' planar surfaces do not closely conform to the micro-relief of the flexible graphite sheet.

Each of the first and second planar conductive elements has at least one planar surface which contacts one of the flexible graphite sheet's parallel surfaces. Contact between the first and second planar conductive elements' planar surfaces and the flexible graphite sheet's parallel surfaces can be direct (i.e., with no intervening material). Alternatively, this contact can be indirect, such as, for example, where the planar conductive element's planar surface contacts the flexible graphite sheet's parallel surface through a thin layer of a conductive material, such as a silver paint film. Where a silver paint film is employed, it is preferably applied to the interface between the planar conductive element and the flexible graphite sheet immediately before bringing these components together and then cured before subjecting the interface to stress.

Except for the requirement that one surface of each of the conductive elements be planar, the conductive elements can be of any suitable shape. Generally, the first and second conductive elements will have the shape of cylinders having a circular, rectangular, or square cross-section. Since the planar conductive elements are typically made of a material that is different than that making up the specimen in which strain or stress is being measured, differences in the shapes of the first and second conductive elements could distort the strain measurement. Therefore, it is preferred that the first and second conductive elements have the same three dimensional shape.

The thickness of the first and second conductive elements, though not critical to the practice of the present invention, is preferably sufficient to minimize distortions at the surface in contact with the flexible graphite sheet caused by irregularities in the surface which is in contact with the specimen whose strain or stress is being measured. Typically, a thickness of about 5 mm to about 20 mm is suitable.

The area of the first and second conductive element's planar surfaces in contact with the flexible graphite sheet relative to the planar surface area of the flexible graphite is not critical to the practice of the present invention. Preferably, the flexible graphite sheet extends almost to the circumference of both conductive elements' surfaces in contact with the flexible graphite sheet.

One particularly preferred configuration is shown in FIG. 1A. First conductive element 2 and second conductive element 4 each have circular cross-sections and are shaped in the form of a cylinder. Surface 6 of conductive element 4 contacts surface 8 of flexible graphite sheet 10 through silver paint film 11. Likewise, surface 12 of conductive element 2 contacts the other surface (not shown) of flexible graphite sheet 10 through silver paint film 13. As shown in FIG. 1A, flexible graphite sheet 10 extends almost to the perimeter of conductive element 4's planar surface 6 and almost to the perimeter of conductive element 2's planar surface 12. As also indicated in FIG. 1A, conductive element 2 and conductive element 4 are aligned with each other so that conductive element 4 and conductive element 2 are mirror images of each other when reflected through a plane defined by flexible graphite sheet 10.

The first and second planar conductive elements can be made of the same or different conductive materials, preferably each having isotropic resistivities of from about $10^{-7}$ to about $10^{-3}$ $\Omega$.cm. Suitable materials include metals, such as aluminum, copper, iron, silver, zinc, and the like; alloys of these metals; conductive polymers, such as metal filled polymers and carbon filled polymers; and carbons such as graphite.

The strain or stress sensor of the present invention can further include two electrically conductive leads, each of which is in contact with one of the first and second planar conductive elements. The electrical contact between the electrically conducting leads and the first and second planar conductive elements can be made, for example, by mechanical attachment, such as with a screw terminal; by welding; by brazing; by soldering; or by the use of electrically conducting adhesives, such as electrically conducting epoxies. The electrically conductive leads can be made of any suitable material, copper wire being most preferred. In order to prevent a short from developing, especially in cases where the electrically conductive leads pass through or may come into contact with an electrically conductive housing, it is preferred that the electrically conductive leads be insulated with a material which is capable of withstanding anticipated environmental conditions. In addition, it is preferred that the leads be protected from mechanical damage by, for example, passing them through conduit or other protective jacketing material.

The electrically conductive leads are connected to a device which is capable of measuring resistance or a property from which resistance can be calculated. For example, the measuring device can be a resistance meter, a conductance meter, or a voltmeter and an ammeter arranged to permit measurement of resistance.

The strain or stress sensor of the present invention is used by detecting a property of the strain or stress sensor which can be related to the electrical resistance between the first and second planar conductive elements. This property which is related to resistance is then correlated to strain or stress. In most cases, the property detected and then correlated to resistance is an electrically measured property, such as resistance, conductance, or, in combination, voltage and amperage.

The strain or stress sensor of the present invention can include a housing which maintains the relative positions of the planar conductive elements and flexible graphite sheet when the strain or stress sensor is not under compressive stress, so that the conductive elements and graphite sheet can be transported as a unit without danger of misaligning or losing components. Alternatively, a variety of other configurations can be used to maintain this alignment, including a dowel pin which extends from one of the planar conductive elements through a hole in the flexible graphite sheet, and into the second planar conductive element.

The strain or stress sensor of the present invention can be used to detect compressive stresses and strains. Generally, the strain or stress sensor is placed in or on the material for which strain or stress is to be measured. In either case, the planar conductive elements are positioned so that they contact the specimen, either directly or indirectly, in such a way that strains or stresses which develop in this specimen are transmitted to the strain or stress sensor. For example, as shown in FIG. 1B, strain or stress sensor 20 can be inserted into hollow 22 of specimen 24 so that surfaces 26 and 28 of strain or stress sensor 20 are in contact with specimen 24. Preferably, strain or stress sensor 20 is oriented so that flexible graphite sheet 30 is perpendicular to the anticipated direction of strain or stress as indicated by arrows 32.

The void in which strain or stress sensor is situated can be located in the interior of the specimen or, alternatively, it can be in contact with the surface of the specimen as shown in FIG. 1C. In still another alternative embodiment, the strain or stress sensor can be mounted on the surface of the specimen by rigidly fixing each of the first and second planar conductive elements to that surface. This embodiment is shown in FIG. 1D.

In many applications, including applications which involve measuring the stresses or strains in concrete structures, the void can be produced during the concrete casting process by holding the strain or stress sensor in its desired position while pouring the concrete into a suitable form. In this case, it is important to provide electrical leads to the first and second conductive elements prior to pouring the concrete. In cases where the specimen is made of a metal or other conductive material, the first and second conductive elements must be electrically isolated from the specimen, such as by inserting a rigid, nondeformable electrically insulating material between the conductive element and the specimen.

The present invention also relates to a strain or stress sensor which includes a polymeric composite, a first electrically conductive lead connected to a first point on or in the polymeric composite and a second electrically conductive lead connected to a second point on or in the polymeric composite. The polymeric composite includes a polymeric matrix material and carbon filaments which are dispersed therein.

A variety of different polymeric matrix materials can be used in the practice of the present invention. Preferably, the polymeric matrix material has a volume resistivity of from about $10^6$ $\Omega$.cm to about $10^{16}$ $\Omega$.cm. Suitable polymeric matrix materials include thermoplastic polymers, thermosetting polymers, and combinations thereof. In particular, the polymeric matrix material can be a polyether sulfone, a polyvinylidine fluoride, a polyethylene, a polyvinyl chloride, a polypropylene, a polyester, an acrylic, a nylon, a cellulosic, an acrylonitrile-butadiene-styrene polymer, a polycarbonate, an acetal, a fluoroplastic, or combinations of these materials.

Carbon filaments suitable for use in the practice of the present invention have diameters of from about 0.01 $\mu$m to about 1.0 $\mu$m, preferably from about 0.1 $\mu$m to about 0.5 $\mu$m, more preferably from about 0.1 $\mu$m to about 0.2 $\mu$m. In addition, it is preferable that the carbon filaments have a non-linear morphology, commonly referred to as a "bent" morphology, resembling cotton wool. Though not critical to the practice of the present invention, the carbon filaments preferably have a length greater than 100 $\mu$m and a volume resistivity of from about $-10^{-4}$ to about $10^{-2}$ $\Omega$.cm.

Carbon filaments suitable for use in making the strain or stress sensors of the present invention can be obtained commercially as ADNH from Applied Sciences Incorporated, Cedarville, Ohio. Alternatively, these carbon filaments can be prepared by the methods described in U.S. Pat. No. 5,165,909 to Tennent et al.; Tibbetts, *Carbon*, 27:745–747 (1989); Ishioka et al., *Carbon*, 30:865–868 (1992); Smith et al., *Ultramicroscopy*, 34:54–59 (1990); Kepinski, *React. Kinet. Catal. Lett.*, 38:363–367 (1989); Kato et al., *Carbon*, 30:989–994 (1992); Gadelle in *Carbon Fibers Filaments and Composites*, Figueiredo et al., eds., Dordrecht, The Netherlands:Kluwer Academic Publishers, pp. 95–117 (1990); Ishioka et al., *Carbon*, 30:859–863 (1992); Baker in *Carbon Fibers Filaments and Composites*, Figueiredo et al., eds., Dordrecht, The Netherlands:Kluwer Academic Publishers, pp. 405–439 (1990); Tibbetts in *Carbon Fibers Filaments and Composites*, Figueiredo et al., eds., Dordrecht, The Netherlands:Kluwer Academic Publishers, pp. 525–540 (1990); Sacco in *Carbon Fibers Filaments and Composites*, Figueiredo et al., eds., Dordrecht, The Netherlands:Kluwer Academic Publishers, pp. 459–505 (1990); Motojima et al., *Carbon*, 29:379–385 (1991); Motojima et al., *Appl. Phys. Lett.*, 56:321–323 (1990); Ishioka et al., *Carbon*, 31:123–127 (1993); Tibbetts, *Carbon*, 30:399–406 (1992); U.S. Pat. No. 4,565,684 to Tibbetts; Tibbetts in *Carbon Fibers Filaments and Composites*, Figueiredo et al., eds., Dordrecht, The Netherlands:Kluwer Academic Publishers, pp. 73–94 (1990); Masuda et al., *Carbon*, 30:124–126 (1992); and Brito et al. in *Proc. Int. SAMPE Symp. and Exhib.* 34, *Tomorrow's Materials: Today*, Zakrzewski et al., eds., pp. 190–201 (1989), which are hereby incorporated by reference.

The carbon filaments and polymeric matrix material which make up the polymeric composite can be present in a wide volume ratio. Preferably, the carbon filaments and the polymeric matrix material are present in the polymeric composite in a volume ratio of from about 3:97 to about 20:80, more preferably 7:93 to about 13:87.

The polymer composite can be prepared by dispersing, by any suitable method, the carbon filaments in the polymer matrix. For example, the polymer matrix, preferably in the form of a powder, and filaments can be mixed together with water or other liquids in a blender or other suitable mixing apparatus for from about 1 minute to about 30 minutes, preferably at a speed of from about 100 to about 2000 rpm.

To aid in this dispersion, it is preferred that the polymer matrix material be in the form of a fine powder, preferably 0.1–300 $\mu$m size, more preferably 1–6 $\mu$m size. In many cases, polymeric materials in such fine particular form are commercially available. Alternatively, a coarser polymeric material powder can be employed by first reducing the average particle size diameter to the preferred range by conventional processes, such as ball milling; grinding; dissolution in a suitable solvent followed by spraying the solvent into a heated chamber; chemical etching; and sieving.

The resulting wet mixture can then be dried, preferably in an oven at a temperature from 100° C. to 150° C., more preferably about 120° C. The resulting dried polymeric composite can be formed into any suitable shape, typically a cylinder having circular, rectangular, or square cross-section. Such freestanding composites can be prepared by introducing the dried mixture into a steel mold and hot pressing under conditions which are suitable for molding the polymeric matrix materials used. For example, in the case where the polymeric matrix material is polyether sulfone, hot pressing can be effected at 310° C. and 13.4 MPa for from about 15 minutes to about 2 hours, preferably for about 30 minutes.

Alternatively, the polymer composite can be coated as a wet mixture on the specimen in which strain or stress is to be measured. The wet mixture is then dried on the surface of the specimen, preferably at the above-described temperatures. In some cases, particularly where the specimen is too large to be fit into an oven, the wet polymeric composite on the specimen's surface can be dried using a stream of hot air, such as from a hair dryer.

As indicated above, the polymeric composite is connected to a pair of electrically conductive leads. The electrically conductive leads can be made of any suitable material, but, typically, are made of metal wire, such as copper wire. As indicated above, with respect to the flexible graphite-containing strain and stress sensors of the present invention, the electrically conductive leads are preferably insulated and protected from mechanical abrasion and damage. Connection to these leads to the polymeric composite can be made using any process or material known to produce electrically conductive bonds between polymers and metals. Illustratively, silver paint, such as silver paint #14810 (Ernest F. Fullam, Inc. (Latham, N.Y.)), solder pastes, or conductive epoxies or adhesives can be used.

Strain or stress sensors of the present invention can optionally include a device which measures resistance or some property which can be related to resistance. For example, the device can be a resistance meter, a conductance meter, or a voltmeter and an ammeter arranged to permit measurement of resistance. The device is in electrical contact with two points on the polymeric composite via the electrically conductive leads and permits measurement or calculation of the resistance between these two points. When a voltmeter and an ammeter are used in conjunction to determine the electrical resistance between two points, a known potential can be applied between the first and second points on or in the polymeric composite. By measuring current flowing between the first and second points on or in the polymeric composite, resistance can be calculated using the equation R=V/I, where V is the voltage, I is the current, and R is the resistance. An alternative scheme involves four points along a line, such that the outer two points are for current passing and the inner two points are for voltage measurement. The four-point scheme is preferred to the two-point scheme, because, in the four-point scheme, the contact resistance does not interfere with the resistance measurement.

The electricity used to measure resistance can be either alternating current ("AC") or direct current ("DC"). In case of AC operation, the measured quantity is either the impedance or the real part (called the resistance) of the complex impedance and the frequency can range from about 10 Hz to about 1 MHz, preferably from about 10 Hz to about 100 Hz. The strain/stress sensitivity is higher for DC than AC. The associated electronics are also simpler for DC than AC operation. For these reasons, DC operation is generally preferred.

It is preferred that the two points selected for connection to the electrically conductive leads be on a line which is parallel to the stress or strain to be measured. In cases where the stress or strain can, from time to time, vary in its spatial orientation or in cases where the stress or strain has more than a single component, additional electrically conductive leads can be attached to the polymeric composite. By measuring or calculating resistance between various pairs of points connected to the polymeric composite, the magnitudes of the strain or stress in directions parallel to the line connecting the various pairs of points can be measured. In some applications, strain or stress is best measured by connecting an array of electrically conductive leads to the polymeric composite so that strain or stress can be determined in any desired direction.

Freestanding strain or stress sensors of the present invention can be used to detect strain or stress in a specimen by securing the strain or stress sensor to the specimen using any of the methods described above with respect to flexible graphite-containing strain or stress sensors. For example, the strain or stress sensor can be embedded into the specimen in which strain or stress is to be measured. Alternatively, the strain or stress sensor can be placed in a pocket which opens to the surface of the specimen, or it can be attached to the surface of the specimen.

In operation, changes in resistance were found to correlate linearly with strain and stress. For a polyether sulfone matrix containing 7 vol. % carbon filaments, strain sensitivity (i.e., the fractional change in resistance per unit strain) is about 1.4. Stress sensitivity (i.e., the fractional change in resistance per unit stress) for this material is about $3.4 \times 10^{-4}$ $MPa^{-1}$. By knowing the strain and stress sensitivities, the amount of strain or stress present in a given specimen can be ascertained by measuring the resistance and multiplying this resistance by the appropriate sensitivity. Strain and stress sensitivities for strain sensors using other polymeric composites can be determined experimentally by methods well known to those skilled in the art, such as those provided in the examples which follow.

The present invention is further illustrated by the following examples.

EXAMPLES

Example 1

Methods and Materials Used in Flexible Graphite Studies

Flexible graphite sheets (Grade GTB) of thickness 1.6 and 3.1 mm were provided by EGC Enterprises, Inc. (Mentor, Ohio). According to the manufacturer, the ash content was less than 5.0%; the density was 1.1 g/cm³; the tensile strength in the plane of the sheet was 5.2 MPa; the compressive strength (10% reduction) perpendicular to the sheet was 3.9 MPa; the thermal conductivity at 1093° C. was 42 W/m.K in the plane of the sheet and 3 W/m.K perpendicular to the sheet; and the coefficient of thermal expansion ("CTE") in the temperature range of 21–1093° C. was $-0.4 \times 10^{-6\circ}$ $C.^{-1}$ in the plane of the sheet.

The electrical resistivity was measured as being $7.5 \times 10^{-4}$ Ω.cm in the plane of the sheet by the four-probe method using silver paint for the electrical contacts. This value is essentially the same as the value of $8 \times 10^{-4}$ Ω.cm given by the manufacturer. The electrical resistivity perpendicular to the sheet is 0.4 Ω.cm according to the manufacturer. However, measurement of the electrical resistivity perpendicular to the sheet by the four-probe method using silver paint for the electrical contacts, two current probes in the form of loops on the opposite faces in the plane of the sheet, and two voltage probes in the form of dots at the centers of the loops, gave values of 0.011±0.001 Ω.cm for the sheet of thickness 1.6 mm (based on four samples cut from the sheet) and 0.037±0.011 Ω.cm for the sheet of thickness 3.1 mm (based on four samples cut from the sheet). The values obtained by the four-probe method rather than those given by the manufacturer were used in this work. The variation in resistivity (perpendicular to the sheet) among different samples cut from the same sheet was small, indicating that each sheet was quite uniform from an electrical viewpoint.

The strain/stress sensing ability of flexible graphite was evaluated using stack 41 illustrated in FIG. 2. Rectangular piece of flexible graphite 42 was sandwiched between two copper cylinders 44 and 46, each of which had a diameter of 12.8 mm and a height of 9.9 mm. Two larger pieces of flexible graphite 48 and 50, cut from the original sheet and, thus, having the same thickness as rectangular piece of flexible graphite 42, were sandwiched between copper cylinders 44 and 52 and between copper cylinders 46 and 54. Larger pieces of flexible graphite 48 and 50 extended beyond the circumference of copper cylinders 44 and 46, whereas rectangular piece of flexible graphite 42 was within the circumference. Silver paint 43 was applied to the interface between each piece of flexible graphite and its adjacent copper cylinder immediately before bringing these components together. A copper wire was soldered to each of the four copper cylinders. The contacts to cylinders 52 and 54 were for direct current ("DC") to pass through, whereas those to copper cylinders 44 and 46 were for measuring the voltage.

A Keithley 2001 multimeter was used to measure the resistance between copper cylinders 44 and 46. Because the volume resistance of each cylinder was negligible, the measured resistance consisted of the volume resistance of rectangular piece of flexible graphite 42 between cylinders 44 and 46 in the direction of the cylinder axis and the contact resistance at each of the two interfaces between copper cylinder 44 or 46 and rectangular piece of flexible graphite 42. This resistance measurement was conducted while cyclic compressive loading (under load control) was applied to stack 41 in the direction of the cylinder axis (shown in FIG. 2 by arrows 56) using a screw-type mechanical testing system (Sintech 2/D), which gave the stress and strain during the test. The strain was given by the crosshead movement of the mechanical testing machine. The crosshead speed was 0.5 mm/min.

Example 2

Cyclic Loading at a −0.42 MPa Stress Amplitude

Figure 3A:
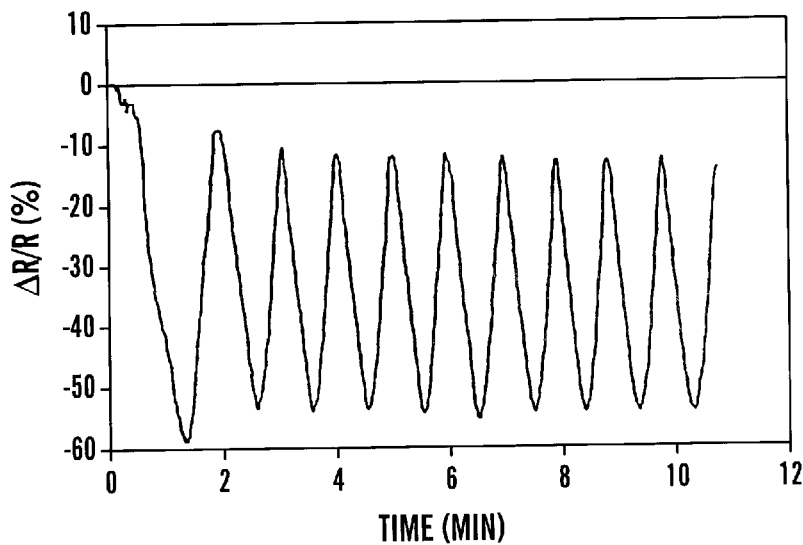
FIG. 3 is a graph showing the fractional resistance increase ("$\Delta R/R_o$") and strain and stress simultaneously obtained during the first 10 compressive loading cycles (under load control) of flexible graphite having a thickness of 1.6 mm and an initial resistance of 0.27 Ω. The stress amplitude was −0.42 MPa.
Figure 3B:
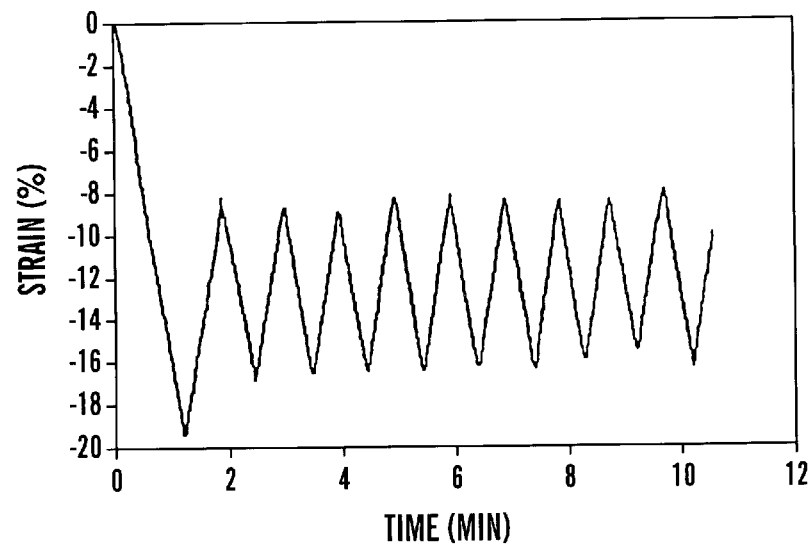
Figure 3C:
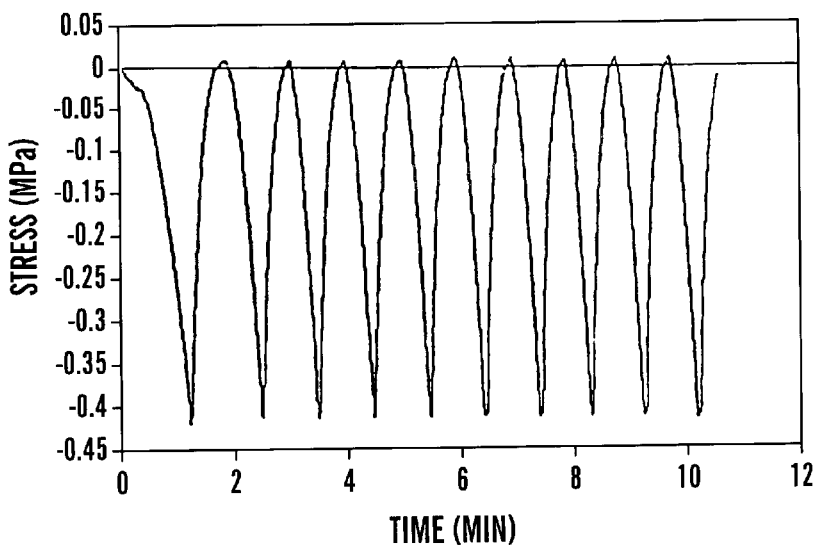

FIG. 3 shows the fractional increase in DC resistance ("$\Delta R/R_o$") (negative for decrease), strain (negative for shrinkage), and stress (negative for compression) simultaneously obtained during the first 10 compressive loading cycles at a constant stress amplitude of −0.42 MPa for a flexible graphite sample (7.6×7.1 mm) having a thickness 1.60 mm. The resistance (initially being 0.27 Ω) decreased during loading and increased during subsequent unloading in every cycle, such that the resistance change was mostly reversible. However, an irreversible portion at the end of the first cycle was observed. Furthermore, the maximum magnitude of $\Delta R/R_o$ was larger in the first cycle than in subsequent cycles. The irreversible portion at the end of a cycle slightly increased after the subsequent cycle, but did not further change after that. Thus, it took two cycles for the cyclic resistance change to stabilize. When stabilized, the magnitude of the reversible portion of $\Delta R/R_o$ was 41%, while the magnitude of the irreversible portion of $\Delta R/R_o$ was 12%.

The magnitude of strain increased with the magnitude of stress during each loading, such that the strain magnitude increase was partly reversible and partly irreversible at the end of the first cycle. The maximum magnitude of strain was larger in the first cycle than in subsequent cycles, probably due to strain hardening. The irreversible portion of strain did not further increase in subsequent cycles. Thus, it took only 1 cycle for the cyclic strain change to stabilize. When stabilized, the magnitude of the reversible portion of strain was 7%, while the magnitude of the irreversible portion of strain was 8%.

The $\Delta R/R_o$ variation closely corresponded to the strain variation, such that (i) a larger magnitude of $\Delta R/R_o$ was associated with a larger magnitude of strain, (ii) the irreversible portion of $\Delta R/R_o$ was associated with the irreversible portion of strain, and (iii) the reversible portion of $\Delta R/R_o$ was associated with the reversible portion of strain. After the initial two loading cycles, the flexible graphite provided reproducible strain/stress sensing.

Figure 4A:
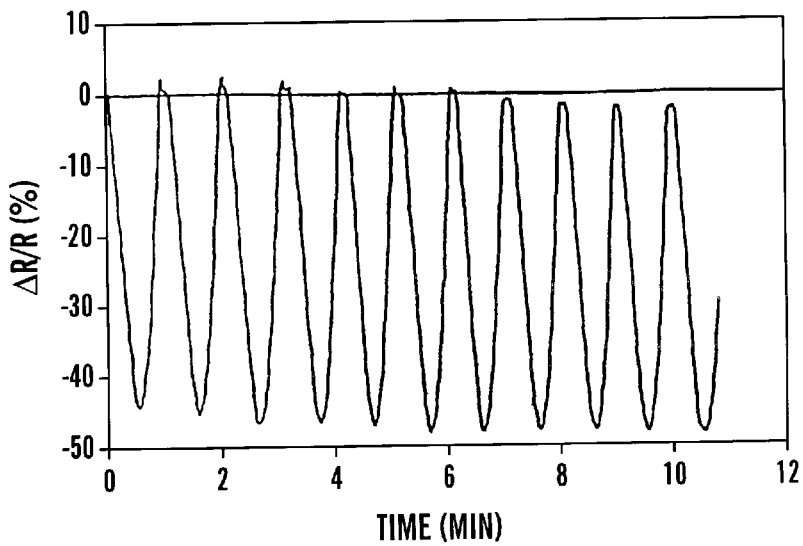
FIG. 4 is a graph showing $\Delta R/R_o$ and strain and stress simultaneously obtained during the first 11 compressive loading cycles (under load control) of flexible graphite having a thickness of 1.6 mm and an initial resistance of 0.23 Ω. The sample had been prior stress cycled (as shown in FIG. 3) for stabilization. The stress amplitude was −0.42 MPa.
Figure 4B:
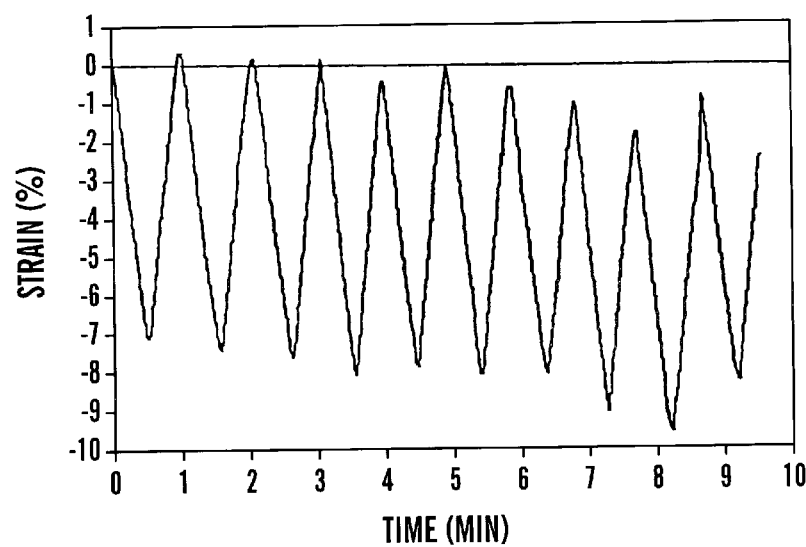
Figure 4C:
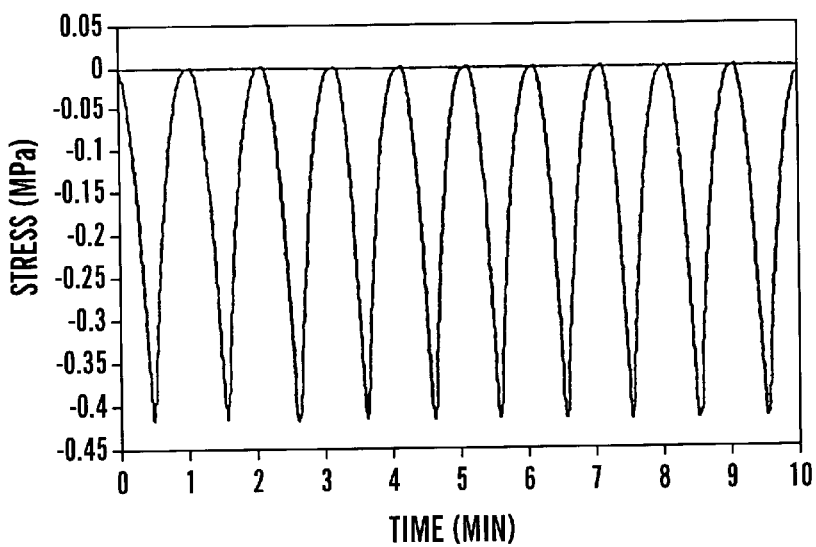

FIG. 4 shows the results for the next 10 cycles using the same sample and stress amplitude as FIG. 3. Immediately after the first 10 cycles (shown in FIG. 3), the resistance was 0.23 Ω (compared to 0.27 Ω before any cycling). The fractional changes ($\Delta R/R_o$ and strain) shown in FIG. 4 are relative to the values immediately after the first 10 cycles. Thus, FIG. 4 displays the strain sensing ability of flexible graphite which had been stabilized. In this stabilized state, a reversible stress of −0.42 MPa gave rise to a reversible strain of −7% and a reversible $\Delta R/R_o$ of −43%. The stress sensitivity (defined as $\Delta R/R_o$ per unit of stress) was 1.0 MPa$^{-1}$; the strain sensitivity (defined as $\Delta R/R_o$ per unit strain) was 6.2.

Example 3

Stress and Strain Sensitivity as a Function of Stress Amplitude

Figure 5A:
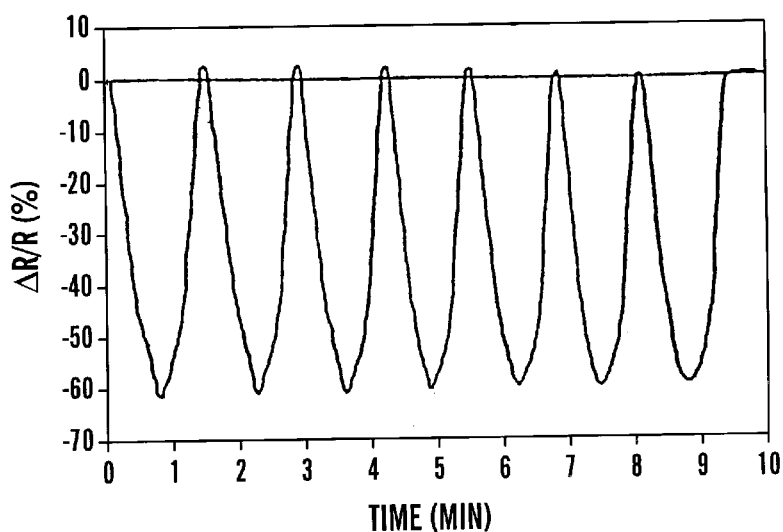
FIG. 5 is a graph showing the fractional resistance increase ("$\Delta R/R_o$") and strain and stress simultaneously obtained during the first 7 compressive loading cycles (under load control) of flexible graphite having a thickness of 1.6 mm and an initial resistance of 0.22 Ω. The sample had been prior stress cycled (as shown in FIGS. 3 and 4) for stabilization. The stress amplitude was −0.83 MPa.
Figure 5B:
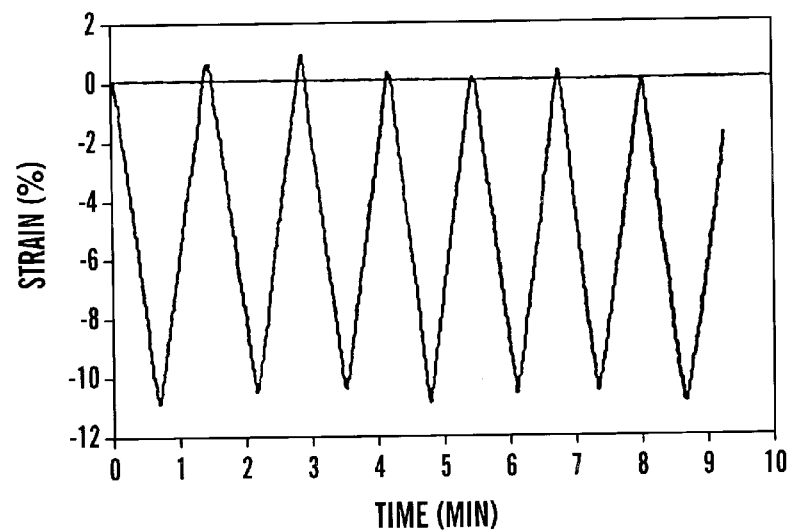
Figure 5C:
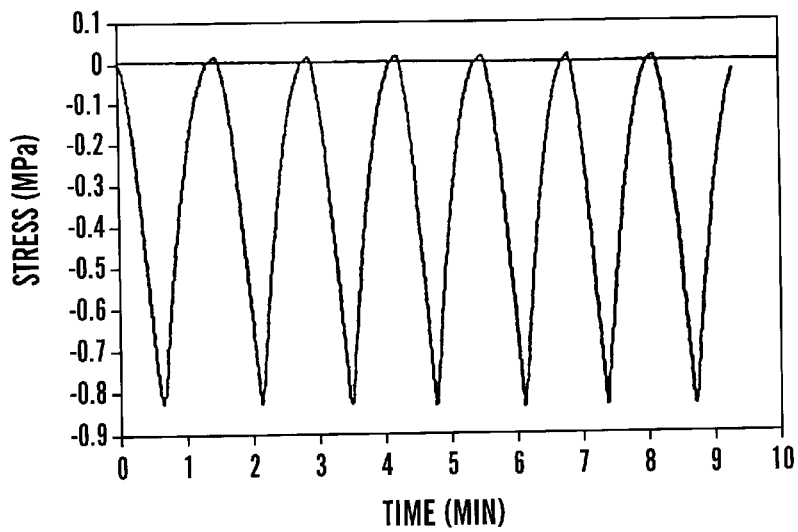

FIG. 5 shows results obtained on the same sample as used in Example 2 but at a stress amplitude of −0.83 MPa and with a starting point which was immediately after the cycling in FIG. 3. At this starting point, R (DC) was 0.22 Ω. FIG. 5, like FIG. 4, displays the strain sensing ability of flexible graphite which had been stabilized. In FIG. 5, reversible stress of −0.83 MPa gave rise to a reversible strain of −11% and a reversible $\Delta R/R_o$ of −60%. Thus, the stress sensitivity was 0.72 MPa$^{-1}$, and the strain sensitivity was 5.5.

Similar results were obtained with the same sample used in FIGS. 3–5, but at stress amplitudes of −1.25, −2.06 and −2.48 MPa. The corresponding reversible $\Delta R/R_o$ was −68%, −70% and −72%, respectively; the corresponding reversible strain was −13%, −17% and −19%, respectively; the corresponding stress sensitivity was 0.54, 0.34 and 0.29 MPa$^{-1}$, respectively; and the corresponding strain sensitivity was 5.4, 4.2, and 3.8, respectively. Thus, both stress sensitivity and strain sensitivity decreased with increasing stress amplitude.

Figure 6A:
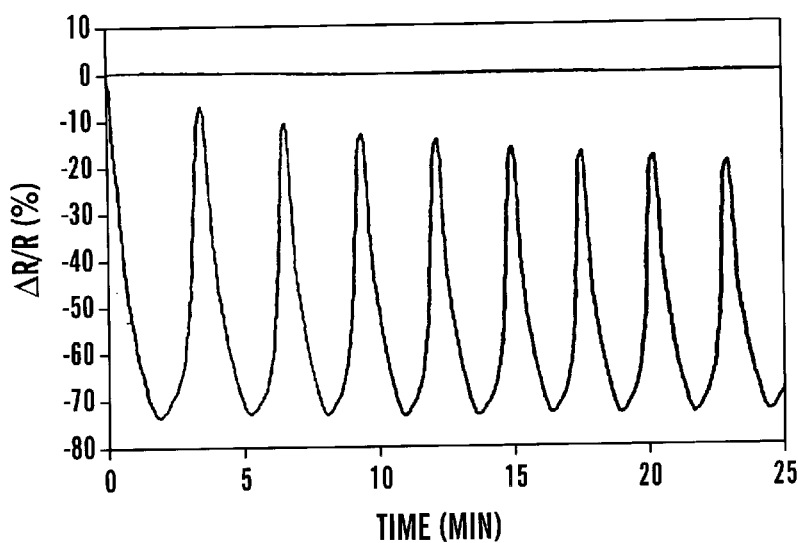
FIG. 6 is a graph showing the fractional resistance increase ("$\Delta R/R_o$") and strain and stress simultaneously obtained during the first 9 compressive loading cycles (under load control) of flexible graphite having a thickness of 1.6 mm and an initial resistance of 0.19 Ω. The sample had been prior stress cycled (as shown in FIGS. 3–5) for stabilization. The stress amplitude was −4.12 MPa.
Figure 6B:
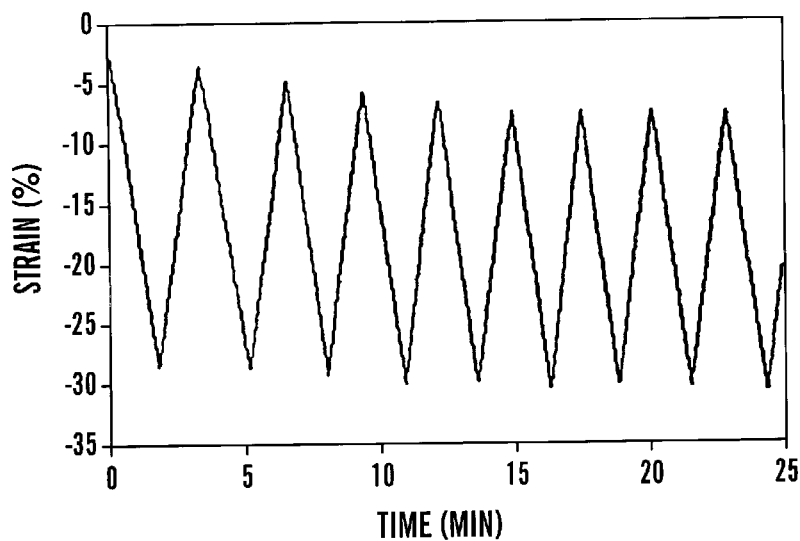
Figure 6C:
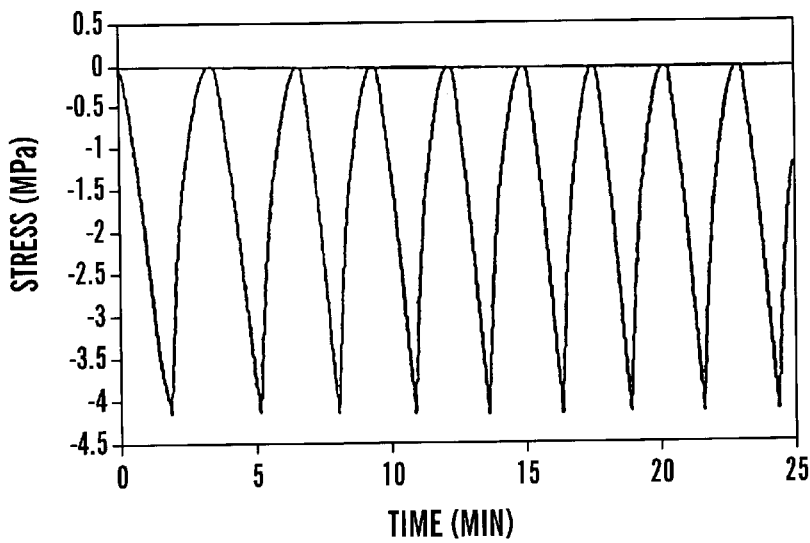

As shown in FIG. 6, when the stress amplitude reached −4.12 MPa, the irreversible portion of the $\Delta R/R_o$ magnitude as well as that of the strain magnitude increased after every cycle, and the maximum strain magnitude (most negative strain) of a cycle increased in every cycle. This is believed to be due to irreversible shrinkage of the flexible graphite in every cycle at the large stress amplitude. Similar behavior was observed at a stress amplitude of −5.78 MPa.

Example 4

Effects of Sample Thickness, Initial Resistance, and Stress Amplitude on Strain and Stress Sensitivity The stress and strain sensitivities for various combinations of sample thickness, initial resistance, and stress amplitude were measured and are listed in Table 1. In most cases, the sensitivities decreased with increasing initial resistance. When the initial resistance was too high, the $\Delta R/R_o$ and strain changes had significant irreversible portions, even after considerable prior cycling. In view of this observation, it is believed that, a small initial resistance is preferred. It is believed that this dependence on the initial resistance can be attributed to the contact resistance between sample and the copper cylinder, which is believed to be an important part of the measured resistance. As shown in Table 1, the volume resistance of the sample, calculated on the basis of a separately measured volume resistivity perpendicular to the sheet, constitutes only a small part of the measured resistance for most of the samples (Table 1). It is believed that low initial resistance reflects mainly a low contact resistance. The contact resistivity can vary significantly from one sample to another, while the volume resistivity variation is much smaller. The observed reversible resistance decrease in most of the samples, therefore, is believed to be primarily due to a decrease in the contact resistivity associated with reversible conforming of the flexible graphite surface to the surface topography of the copper cylinder upon compression. The reversibility is possible due to the resilience of flexible graphite. The contributions to the observed resistance decrease by a possible reversible resistivity decrease (such as one resulting from a microstructural change) in the flexible graphite upon compression and by the thickness decrease are small in most of the samples. A high initial resistance corresponds to a high contact resistivity (i.e., a poor interface), which in turn corresponds to a large irreversible portion of $\Delta R/R_o$. The irreversible $\Delta R/R_o$ corresponds to irreversible strain, which, in turn, is associated partly with the irreversible tendency of the flexible graphite sheet to conform to the surface topography of the copper cylinder and partly with irreversible thickness decrease.

As the data in Table 1 indicate, large thickness appears to yield higher sensitivities, as suggested by the outstandingly high stress sensitivity for the sample with both a large thickness (3.1 mm) and a low initial resistance (0.034 Ω). Thus, it is believed that preferred conditions for high stress and strain sensitivities are low stress amplitude, low initial resistance, and large thickness.

TABLE 1

| Thickness (mm) | Initial DC resistance (Ω) | Fraction of initial DC resistance due to volume resistance | Stress amplitude (MPa) | Sensitivity Stress (MPa$^{-1}$) | Strain |
|---|---|---|---|---|---|
| 1.6 | 0.042 | 0.079[b] | 0.12 | 2.0 | 5.4 |
| 1.6 | 0.051 | 0.065[b] | 0.172 | 1.3 | 3.4 |
| 1.6 | 0.27 | 0.012[b] | 0.42 | 1.0 | 6.2 |
| 1.6 | 0.36 | 0.009[b] | 0.11 | [a] | [a] |
| 3.1 | 0.034 | 0.58[c] | 0.076 | 5.4 | 3.4 |
| 3.1 | 0.084 | 0.23[c] | 0.166 | 0.72 | 1.5 |
| 3.1 | 0.106 | 0.18[c] | 0.24 | [a] | [a] |

[a]Significant irreversible portions for both $\Delta R/R_o$ and strain.
[b]Volume resistance = 0.0033 Ω, as calculated from volume resistivity and sample dimensions.
[c]Volume resistance = 0.020 Ω, as calculated from volume resistivity and sample dimensions.

Example 5

Methods and Materials Used in Filament-Containing Composite Studies

Polyether sulfone ("PES"), a thermoplastic having a volume resistivity of greater than $10^{10}$ Ω.cm (Victrex PES 4100P provided by ICI), was used as the matrix materials in all composites. Carbon fibers having a 10 μm diameter, a 1 mm length, and volume resistivity of $10^{-3}$ Ω.cm were provided as Carboflex (Ashland Petroleum Co., Ashland, Ky.). Carbon filaments having a 0.15 μm diameter and a length greater than 100 μm were provided as ADNH (Applied Sciences Inc., Cedarville, Ohio). A scanning electron microscope photograph showed that the carbon filaments had a bent morphology, resembling cotton wool. In contrast, the carbon fibers were straight.

The composites were fabricated by mixing polyether sulfone powder (100–150 μm size) and either 10 μm carbon fiber or 0.15 μm carbon filament filler with water in a blender, drying the wet mixture at 120° C., and then hot pressing the dried mixture in a steel mold at 310° C. and 13.4 MPa for 30 min.

DC electrical resistance ("R") was measured using the four-probe method while cyclic tension or cyclic tension-compression was applied at a displacement rate of 1 mm/min. Silver paint was used for electrical contacts. The four probes consisted of two outer current probes and two inner voltage probes. R refers to the sample resistance between the inner probes measured along the stress axis. The distance between the inner probes was 25 mm. The samples were 80×8×3 mm in size. The strain was measured using a strain gauge. Testing was conducted by using a hydraulic materials testing system (MTS 810). Tensile testing was similarly performed, except that R was not measured.

Example 6

Effect of Stress on Fractional Resistance

Figure 7A:
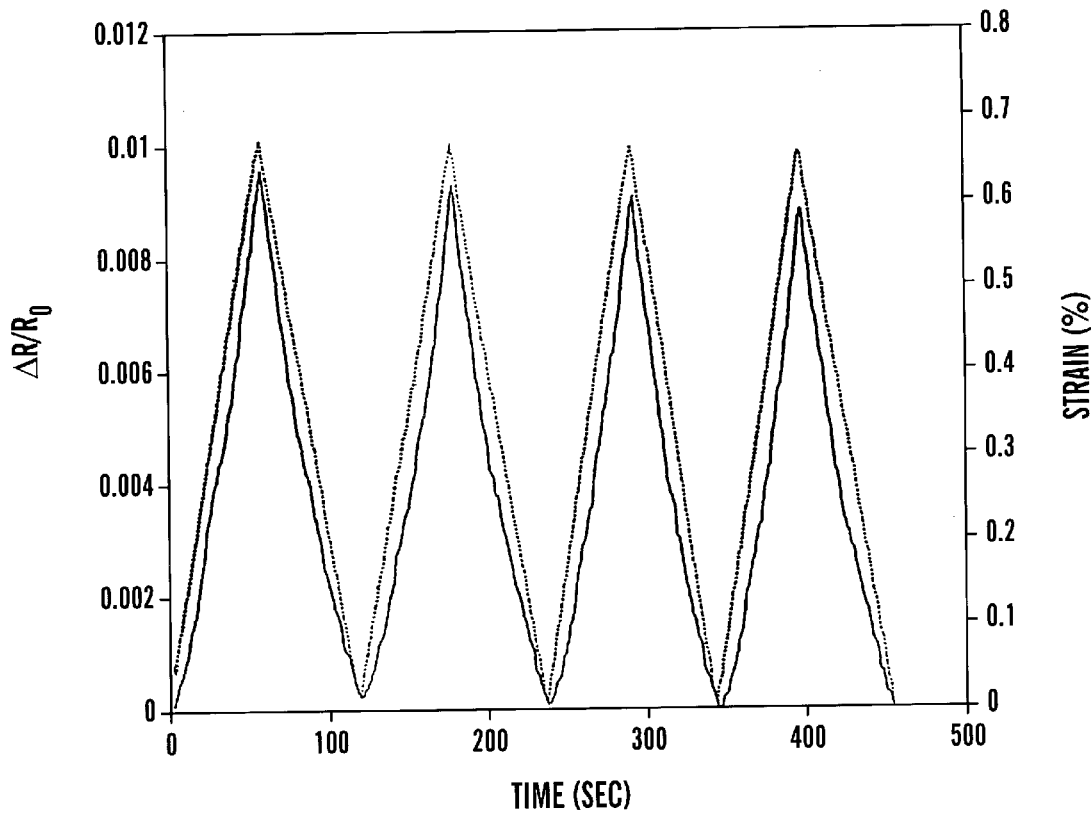
FIG. 7A is a graph showing the variation of $\Delta R/R_o$ (solid line) and strain (dashed line) as a function of time during cyclic tensile loading for a strain or stress sensor of the present invention.
Figure 7B:
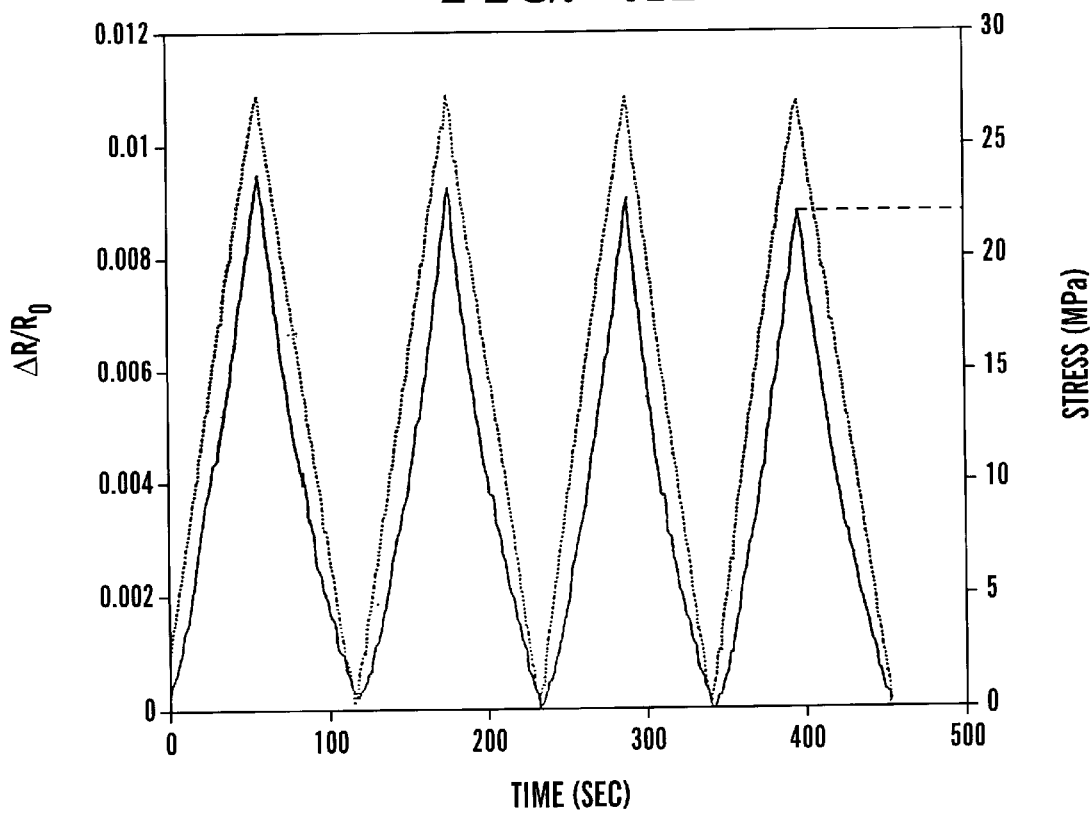
FIG. 7B is a graph showing the variation of $\Delta R/R_o$ (solid line) and stress (dashed line) as a function of time during cyclic tensile loading for a strain or stress sensor of the present invention. The strain or stress sensor was made of a polymeric composite which contained 7 vol. % carbon filaments dispersed in a polyether sulfone ("PES") matrix.

FIGS. 7A–7B show the strain and stress, respectively, as well as the fractional resistance increase ($\Delta R/R_o$) obtained simultaneously during cyclic tension for a composite with 7 vol. % carbon filaments. Because of the small strains involved, $\Delta R/R_o$ was essentially equal to the fractional increase in resistivity.

Figure 8:
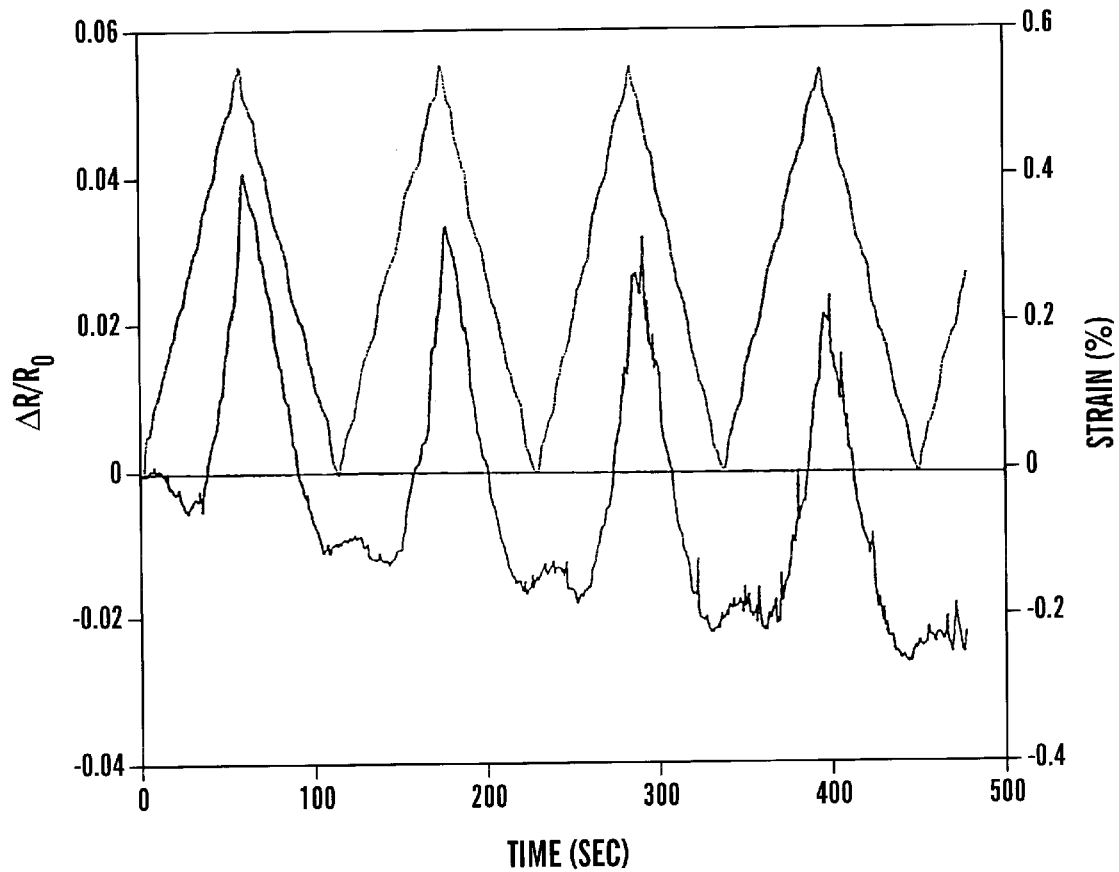
FIG. 8 is a graph showing the variation of $\Delta R/R_o$ (solid line) and strain (dashed line) as a function of time during cyclic tensile loading for a PES matrix composite containing 13 vol. % of carbon fibers.

FIG. 8 shows the strain and $\Delta R/R_o$ obtained at a similar strain amplitude for a composite with 13 vol. % carbon fibers. With 7 vol. % fibers, the composite was not sufficiently conducting, so 13 vol. % fibers was used. It was observed that the percolation threshold was lower for filament composites than fiber composites, which could explain this observation. Table 2 presents the volume electrical resistivities of PES-matrix composites containing various volume fractions of carbon filaments and carbon fibers.

TABLE 2

| | Electrical resistivity (Ω · cm) | |
|---|---|---|
| Filler vol. % | Filaments | Fibers |
| 3 | 112 | / |
| 7 | 3.78 | 678 |
| 13 | 0.34 | 16.9 |
| 19 | 0.12 | / |

The relationship between $\Delta R/R_o$ and strain was far more linear for 0.15μ filaments than for 10 μm fibers. As shown in FIG. 8, $\Delta R/R_o$ decreased slightly upon tension, probably due to fiber straightening, before abruptly increasing upon further tension, probably due to piezoresistivity; $\Delta R/R_o$ was also seen to increase slightly toward the end of each cycle (probably due to fiber buckling) and then decreased at the beginning of the following cycle (probably due to fiber straightening) before increasing abruptly with increasing strain (probably due to piezoresistivity). In contrast, FIG. 7A does not exhibit this abnormality. On the other hand, both the 0.15 μm filaments and the 10 μm fibers exhibited $\Delta R/R_o$'s which became more and more negative as cycling progressed.

Figure 9:
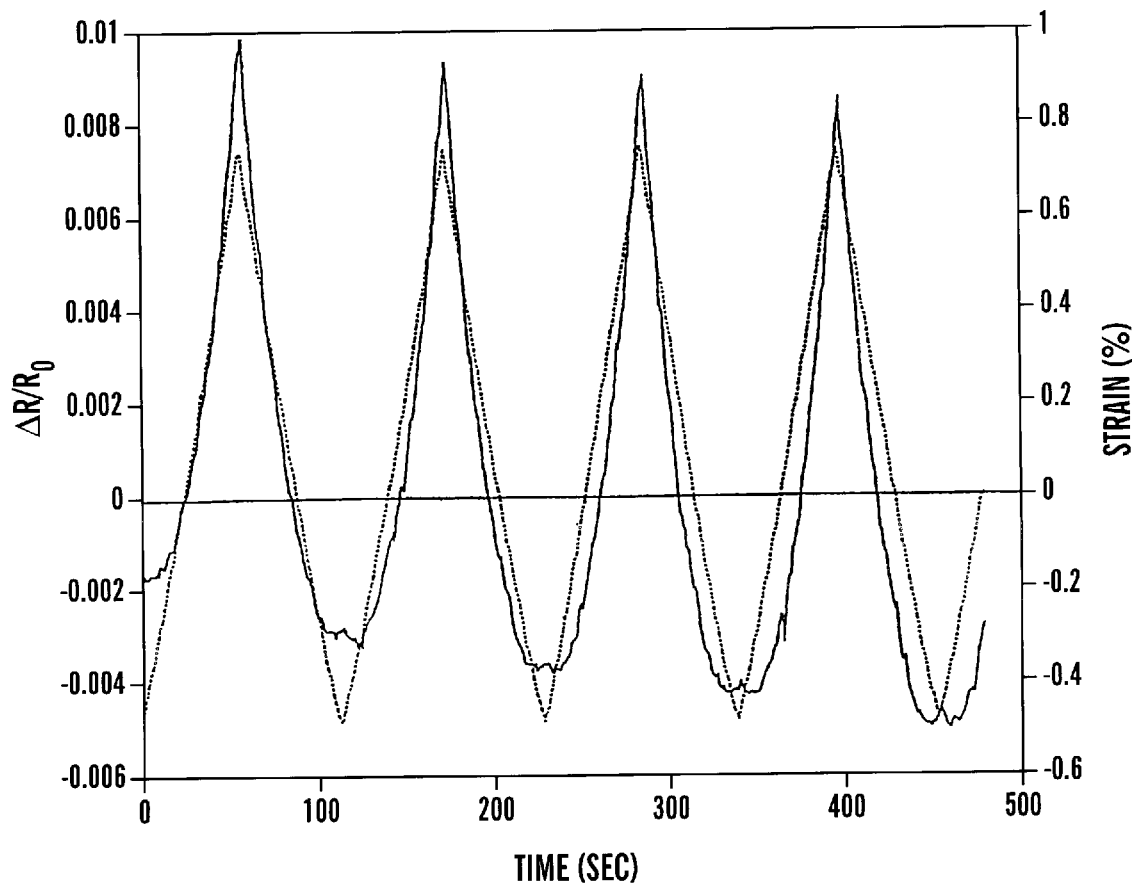
FIG. 9 is a graph showing the variation of $\Delta R/R_o$ (solid line) and strain (dashed line) as a function of time during cyclic tensile-compressive loading for a strain or stress sensor of the present invention made of a PES matrix composite containing 7 vol. % of carbon filaments.
Figure 10:
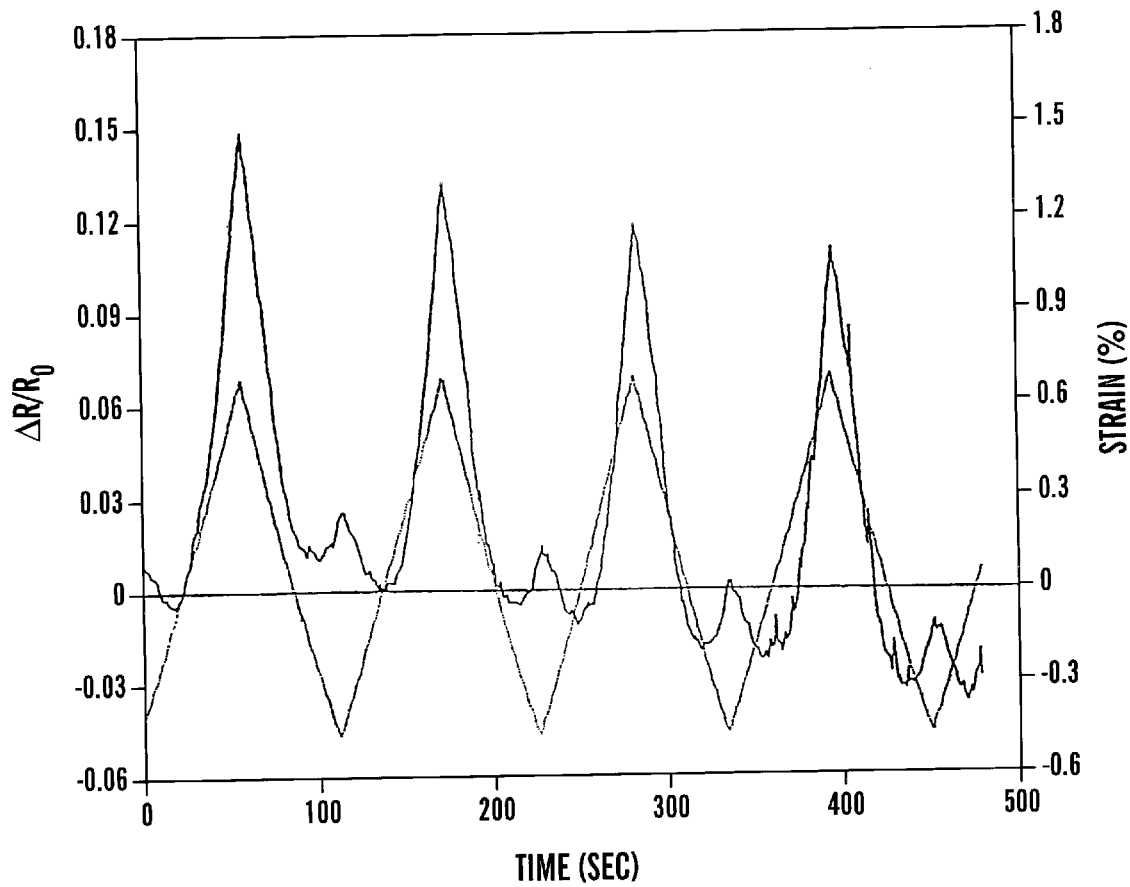
FIG. 10 is a graph showing the variation of $\Delta R/R_o$ (solid line) and strain (dashed line) as a function of time during cyclic tensile-compressive loading for a PES matrix composite containing 13 vol. % of carbon fibers.

FIGS. 9 and 10, respectively, show similar results for the 0.15 μm filament and the 10 μm fiber containing composites obtained during cyclic tension-compression at similar strain amplitudes. Not only is FIG. 10 far more non-linear than FIG. 9, FIG. 10 exhibits a portion in the compression part of each cycle in which $\Delta R/R_o$ increased reversibly upon compression. Since piezoresistivity is such that $\Delta R/R_o$ decreases upon compression, it is believed that this abnormal effect can be attributed not to a change in separation between the fibers, but to a change in degree of straightness of the fibers. Upon compression beyond the point at which the adjacent fibers touch one another, the fibers decrease in degree of straightness due to fiber buckling, thus causing the resistivity to increase reversibly. FIG. 8 also shows this effect, though to a much smaller extent due to the zero compressive strain amplitude. The absence of this effect in FIG. 9 can be attributed to the bent morphology of the filaments and the resulting absence of filament buckling.

As in FIGS. 7 and 8, FIGS. 9 and 10 exhibit the trend in which $\Delta R/R_o$ became more and more negative as cycling progressed. This trend leveled off after about 10 cycles for both composites, as shown in FIG. 9 and 10. This trend can be attributed to the decrease in the matrix film thickness at the junction of the filaments or fibers as the cycling progressed during the first 10 cycles. A decrease in this thickness is believed to give rise to a decrease in the contact resistivity between the filaments or fibers and, thereby, a decrease in the volume resistivity of the composite. Comparison of FIGS. 11 and 12 shows that the extent of decrease was larger for the 10 μm fiber-containing composite (FIG. 12) than the 0.15 μm filament-containing composite (FIG. 11) at similar strain amplitudes.

Figure 11:
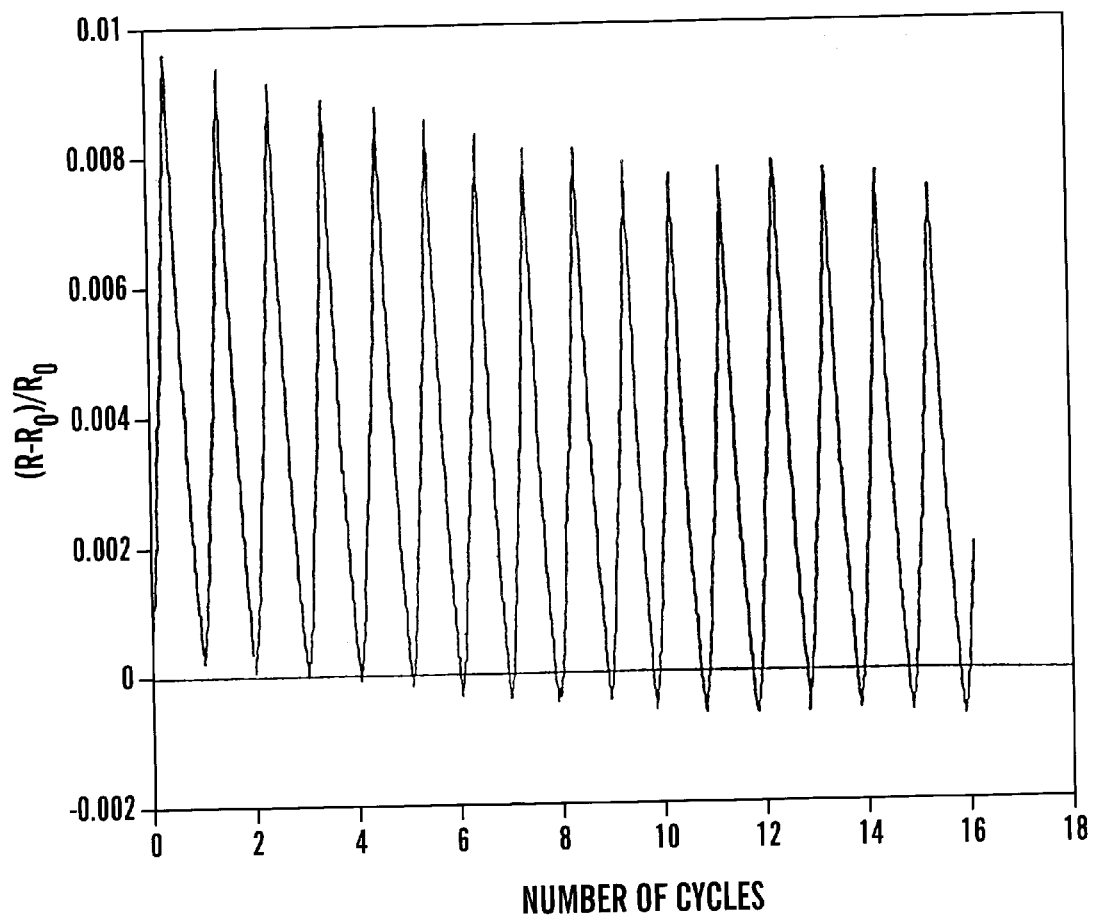
FIG. 11 is a graph showing the variation of $\Delta R/R_o$ with cycle number during cyclic tensile loading for a strain or stress sensor of the present invention made of a PES matrix composite containing 7 vol. % of carbon filaments. The strain amplitude was 0.7%.
Figure 12:
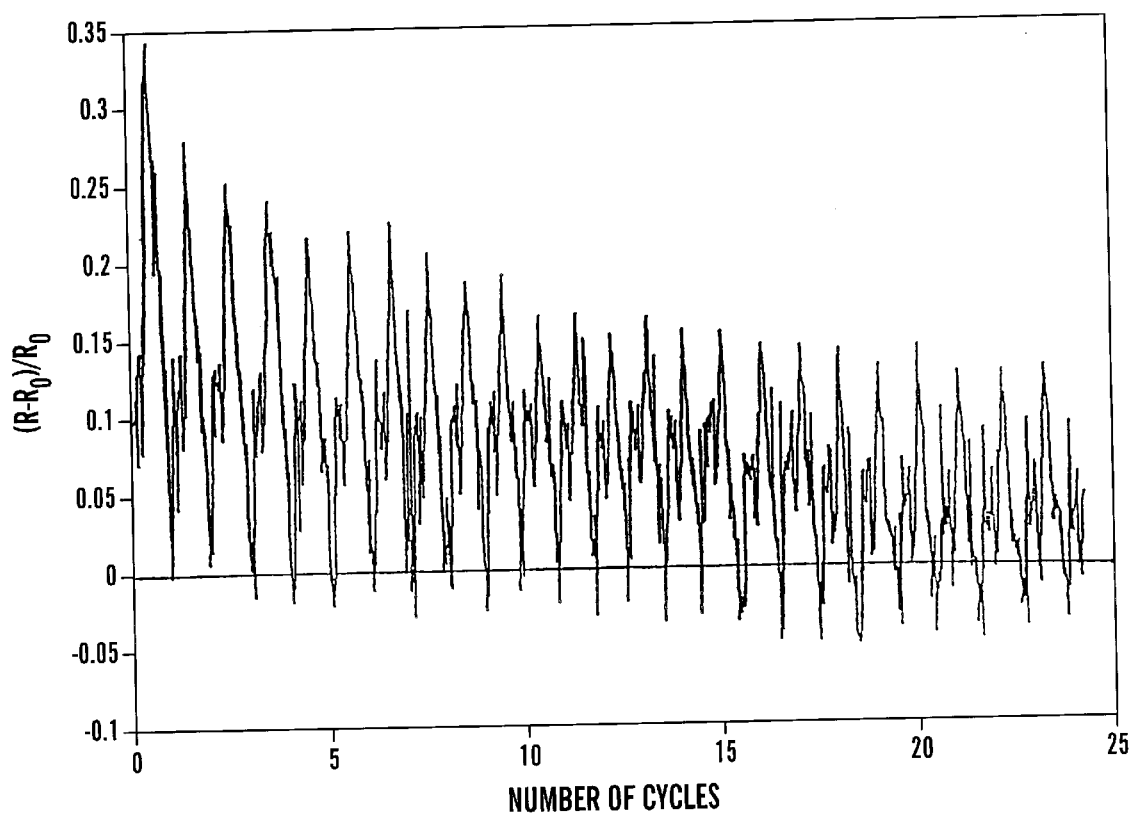
FIG. 12 is a graph showing the variation of $\Delta R/R_o$ with cycle number during cyclic tensile loading for a PES matrix composite containing 13 vol. % of carbon fibers. The strain amplitude was 0.8%.

Comparison of FIG. 7A with FIG. 8, FIG. 9 with FIG. 10, and FIG. 11 with FIG. 12 shows that, at similar strain amplitudes, the noise in the variation of $\Delta R/R_o$ with strain was smaller for the filament composite than the fiber composite.

Table 3 gives the tensile properties of some of the composites of Table 2. Comparison of the composites with carbon filaments and carbon fibers at the same volume fraction (7%) shows that the carbon fibers are a more effective reinforcement than the carbon filaments. However, increasing the carbon fiber volume fraction from 7% to 13% degraded the tensile properties slightly. Nevertheless, the differences in tensile properties for the various composites in Table 3 are too small to be of much concern to the use of the composites as sensors.

TABLE 3

| Filler | Ultimate strength (MPa) | Young's modulus (GPa) | Strain at break (%) |
|---|---|---|---|
| 7% carbon filaments* | 47.6 ± 3.4 | 3.8 ± 0.1 | 1.3 ± 0.1 |
| 7% carbon fibers+ | 53.8 ± 2.4 | 4.1 ± 0.3 | 1.8 ± 0.2 |
| 13% carbon fibers+ | 51.3 ± 2.8 | 3.6 ± 0.2 | 1.7 ± 0.2 |

*Four specimens tested.
+Two specimens tested.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A strain or stress sensor comprising:
   a polymeric composite comprising a polymeric matrix material and carbon filaments having diameters of from about 0.01 μm to about 1.0 μm dispersed therein;
   a first electrically conductive lead connected to a first point on or in said polymeric composite; and
   a second electrically conductive lead connected to a second point on or in said polymeric composite.

2. A strain or stress sensor according to claim 1, wherein the carbon filaments have diameters of from about 0.1 μm to about 0.5 μm.

3. A strain or stress sensor according to claim 1, wherein the carbon filaments have a non-linear morphology.

4. A strain or stress sensor according to claim 1, wherein the polymeric matrix material is a thermoplastic polymer or a thermosetting polymer.

5. A strain or stress sensor according to claim 1, wherein the polymeric matrix material is selected from the group consisting of a polyether sulfone, a polyvinylidine fluoride, a polyethylene, a polyvinyl chloride, a polypropylene, a polyester, an acrylic, a nylon, a cellulosic, an acrylonitrile-butadiene-styrene polymer, a polycarbonate, an acetal, a fluoroplastic, and combinations thereof.

6. A strain or stress sensor according to claim 1, wherein the polymeric matrix material has a volume resistivity of from about $10^6$ Ω.cm to about $10^{16}$ Ω.cm.

7. A strain or stress sensor according to claim 1, wherein the carbon filaments and the polymeric matrix material are present in said polymeric composite in a volume ratio of from about 7:93 to about 13:87.

8. A strain or stress sensor according to claim 1, further comprising:
   a voltmeter and an ammeter arranged to measure of resistance, a resistance meter, or a conductance meter in electrical contact with said first and second electrically conductive leads.

9. A method for detecting strain or stress comprising:
   providing a polymeric composite comprising a polymeric matrix material and carbon filaments having diameters of from about 0.01 μm to about 1.0 μm dispersed therein;
   detecting a property of the polymeric composite which is correlated to electrical resistance between a first point on or in the polymeric composite and a second point on or in the polymeric composite; and
   correlating the property to strain or stress.

10. A method according to claim 9, wherein the carbon filaments have diameters of from about 0.1 μm to about 0.2 μm.

11. A method according to claim 9, wherein the carbon filaments have a non-linear morphology.

12. A method according to claim 9, wherein the polymeric matrix material is a thermoplastic polymer or a thermosetting polymer.

13. A method according to claim 9, wherein the polymeric matrix material is selected from the group consisting of a polyether sulfone, a polyvinylidine fluoride, a polyethylene, a polyvinyl chloride, a polypropylene, a polyester, an acrylic, a nylon, a cellulosic, an acrylonitrile-butadiene-styrene polymer, a polycarbonate, an acetal, a fluoroplastic, and combinations thereof.

14. A method according to claim 9, wherein the polymeric matrix material has a volume resistivity of from about $10^6$ Ω.cm to about $10^{16}$ Ω.cm.

15. A method according to claim 9, wherein the carbon filaments and the polymeric matrix material are present in the polymeric composite in a volume ratio of from about 7:93 to about 13:87.

16. A method according to claim 9, wherein said detecting comprises:

measuring resistance or conductance or measuring and using voltage and amperage together to determine resistance or conductance between the first and second points on or in the polymeric composite.

17. A method according to claim 9, wherein said detecting comprises:

applying a known potential between the first and second points on or in the polymeric composite and measuring current flowing between the first and second points on or in the polymeric composite.

\* \* \* \* \*